United States Patent [19]
Smith et al.

[11] Patent Number: 5,418,047
[45] Date of Patent: May 23, 1995

[54] CONDUCTIVE ARTICLES OF INTRACTABLE POLYMERS

[75] Inventors: Paul Smith; Alan Heeger; Fred Wudl, all of Santa Barbara; Jin Chiang, Goleta, all of Calif.

[73] Assignee: The Regents of the University of California, Oakland, Calif.

[21] Appl. No.: 108,189

[22] Filed: Aug. 17, 1993

Related U.S. Application Data

[60] Continuation of Ser. No. 867,072, Apr. 13, 1992, abandoned, which is a continuation of Ser. No. 672,052, Mar. 18, 1991, abandoned, which is a division of Ser. No. 105,140, Oct. 5, 1987, Pat. No. 5,028,354.

[51] Int. Cl.$^6$ .............. B32B 5/00; H01B 1/04; H01B 1/06; H01M 4/60
[52] U.S. Cl. .................... 428/212; 428/98; 428/373; 428/224; 428/364; 428/500; 428/516; 524/165
[58] Field of Search .............. 428/98, 212, 224, 364, 428/373, 500, 516; 252/500, 513, 518; 524/165, 173

[56] References Cited

U.S. PATENT DOCUMENTS 4,634,636  1/1987  Yoshino et al. ............ 428/702
5,028,354  7/1991  Smith ...................... 428/373

Primary Examiner—P. C. Sluby
Attorney, Agent, or Firm—Morrison & Foerster

[57] ABSTRACT

Conducting articles such as fibers, films, tapes and the like are fabricated from intractable conducting polymers such as polyacetylene. The articles are prepared by (a) forming a gel of a carrier polymer in a compatible solvent, (b) polymerizing, within the gel, a selected monomer, and (c) doping the article so provided. The articles are highly electrically conductive as well as mechanically quite strong.

14 Claims, 2 Drawing Sheets

CONDUCTIVE ARTICLES OF INTRACTABLE POLYMERS

This application is a continuation of application Ser. No. 07/867,072, filed Apr. 13, 1992, now abandoned, which is a continuation of Ser. No. 07/672,052, filed Mar. 18, 1991, now abandoned, which is a divisional of Ser. No. 07/105,140, filed Oct. 5, 1987, now U.S. Pat. No. 5,028,354.

FIELD OF THE INVENTION

This invention relates generally to conducting polymers, and more particularly relates to shaped articles such as fibers, tapes, rods and films which may be formed from conducting, normally "intractable", polymers.

BACKGROUND OF THE INVENTION

With the discovery of conducting polymers about ten years ago, the possibility of combining the important electronic properties of semiconductors and metals with the attractive mechanical properties and processing advantages of copolymers was proposed. Without exception, however, the initial conducting polymer systems were insoluble, intractable, and non-melting (and thus not processable) with relatively poor mechanical properties. Specific examples of intractable conducting polymers with attractive electronic properties are polyacetylene $((CH)_x)$, and polyparaphenylene $(C_6H_4)_x$. These two systems have the highest density of pi electrons, and both can be doped either p-type (oxidation) or n-type (reduction). Other well-known examples are "polyaniline", or poly(paraphenyleneimineamine) (PPIA), and polypyrrole, which are air stable.

The class of conducting polymers has been enlarged, and a good understanding of the fundamental molecular features which are necessary to achieve and control the electronic properties of these polymers has begun to develop. Soluble conducting polymers have been developed (i.e., soluble either in water or in common organic solvents), and initial attempts at processing from solution have proven successful. Major improvements have been made in material quality and in environmental stability as well as in the achievement of highly oriented (chain-aligned) materials. Based on this progress, there is every reason to believe that these materials will continue to evolve to the point where they can be used in a wide variety of technological applications. A number of potentially important application areas have already been identified, including use as anisotropic electrical conductors, use in novel electrochemical applications, and use in the exploitation of nonlinear optical phenomena.

Progress has been made toward rendering specific systems soluble and thereby processable. For example, the poly(3-alkylthiophene) derivatives (P3ATs) of polythiophene are generally soluble and have been processed into films and fibers. See, e.g., Hotta, S., et al., *Macromolecules* 20:212 (1987); Nowak, M., et al., *Macromolecules* (in press); Hotta, S., et al. *Synth. Met.* (in press); Elsenbaumer, R. L., et al. *Synth. Met.* 15:169 (1986); *Polym. Mat. Sci. Eng.* 53:79 (1985); and Sato, M., et al., *J. Chem. Soc. Chem. Commun.* 83 (1986). However, the enhanced solubility was achieved by adding relatively long alkyl chains onto the polymer backbone, on the 3-position of the thiophene ring. The recently discovered water-soluble self-doped conducting polymers (see Patil, A. O., et al., *J. Amer. Chem. Soc.* 109:1858 (1987); and Patil, A. O., et al., *Synth. Met.*, in press) also achieve solubility through functionalizing at the 3-position of the thiophene ring with the relatively bulky $(CH_2)_nSO_3$ group. Other related examples exist.

Although important, these soluble conducting polymers also have a number of inherent disadvantages. Films, fibers, and the like formed from these polymers have a lower density of pi electrons. They also have reduced interchain electron transfer integrals, and the monomers have a higher molecular weight due to the addition of the flexible side group. Since the density of pi electrons is a critical parameter in determining the electronic properties of a material, ranging from the material's electrical conductivity to its nonlinear optics, the pi electron density should be maximized. Also, because macroscopic electrical properties are limited by the ability of electrons to move from chain to chain, interchain transfer should actually be optimized. As the energy density of a polymer battery electrode decreases with the addition of nonconjugated side-groups, these soluble systems will inherently have lower energy density. As a result, the electronic properties of the soluble conducting polymers are quite limited relative to the aforementioned intractable systems. For example, the higher electrical conductivity reported for doped films of the P3ATs is about 100 S/cm, whereas unoriented polyacetylene can be prepared with a conductivity of at least 2000 S/cm; for oriented materials, values in excess of $10^5$ S/cm have been reported (Naarmann, H., *Synth. Met.* 17:2233 (1987); Naarmann, H., Symposium on "Conducting Polymers: Their Emergence and Future", Amer. Chem. Soc. Meeting, Denver, Colo., Apr. 8–9, 1987, in which conductivity of $1.5 \times 10^5$ S/cm was reported for iodine-doped polyacetylene). Thus, although processing from solution offers some advantages, it has limited applicability within the class of conducting polymers, as degradation of many electronic properties would result.

As an alternative to the soluble conducting polymer systems, shaped articles such as fibers, tapes and the like fabricated from intractable conducting polymers are generally unknown, and yet would be highly desirable in a wide range of technological applications. If, in addition, such shaped articles could be made with the polymer chains highly oriented along the draw direction, the resulting conducting polymers would be expected to be highly anisotropic with the desired electrical, optical, and nonlinear optical properties principally along the orientation direction.

To this end, alternative methods of synthesizing polyacetylene have been explored. The synthesis developed at Durham University (so-called Durham polyacetylene) offers particular advantages in that a soluble and processable prepolymer is converted to polyacetylene as a final step (Feast, W. J. in ref. 1, Chapter 1, vol. 1; Bott, D. C., et al., *Mol. Cryst. Liq. Cryst.* 117:95 (1985); Kahlert, H., et al., *Mol. Cryst. Liq. Cryst.* 117:1 (1985)). The Durham polyacetylene can be prepared as amorphous material, or it can be stretch-oriented simultaneously with conversion and isomerization into highly anisotropic free-standing fibers or films. A gel phase of the processable precursor polymer has been used to produce fibers which were subsequently converted to polyacetylene. The resulting materials, however, had limited utility (e.g., maximum conductivity after doping of only 30 S/cm). Moreover, although the resulting Durham polyacetylene can be made so that it is a highly oriented material, it has specific disadvantages which limit its potential utility. The fibrillar morphology is not present in Durham polyacetylene; this material has a high density with no microstructure visible by electron microscopy. Consequently, the doping kinetics of Durham polyacetylene are extremely slow, limiting the areas of potential application. Furthermore, the electrical conductivity of the resulting material after doping is limited; maximum values in the literature are below 1500 S/cm.

Thus, the ability to fabricate electroactive polymers into shaped articles such as fibers, films and the like remains seriously limited.

SUMMARY OF THE INVENTION

It is accordingly an object of the present invention to overcome the aforementioned disadvantages of the prior art and, primarily, to provide shaped articles fabricated from normally intractable, conducting polymers.

It is additionally an object of the present invention to provide oriented fibers, tapes and the like fabricated from intractable conductive polymers.

It is another object of the invention to provide shaped articles fabricated from composites of intractable conducting polymers, the composites having improved electrical and mechanical properties.

It is still another object of the invention to provide oriented fibers, tapes and the like fabricated from oriented composites of intractable conducting polymers.

It is a further object of the invention to provide methods of making the aforementioned shaped articles.

Additional objects, advantages and novel features of the invention will be set forth in part in the description which follows, and in part will become apparent to those skilled in the art on examination of the following, or may be learned by practice of the invention. The objects and advantages of the invention may be realized and attained by means of the instrumentalities and combinations particularly pointed out in the appended claims.

In one aspect of the invention, shaped conducting articles such as fibers, tapes, rods and films are fabricated from intractable polymers. Initially, a preshaped reaction medium is prepared, e.g., in the form of a fiber, tape, film, or the like. This is achieved by producing a mechanically coherent and stable gel comprised of a relatively minor amount of a "carrier" polymer dispersed within a suitable solvent various compounds necessary for the production of the final intractable polymer, e.g., monomers and catalysts, may be introduced into the gel either (1) after the carrier gel is formed (for example, by diffusion) or (2) prior to gelation, typically by dispersion or dissolution in the carrier solution. Subsequently, the gel is transformed into the final product by the proper chemical reactions.

Surprisingly, it was found that this procedure yields conductive, mechanically coherent articles formed from normally intractable polymers such as polyacetylene.

DETAILED DESCRIPTION OF THE INVENTION

Figure 1:
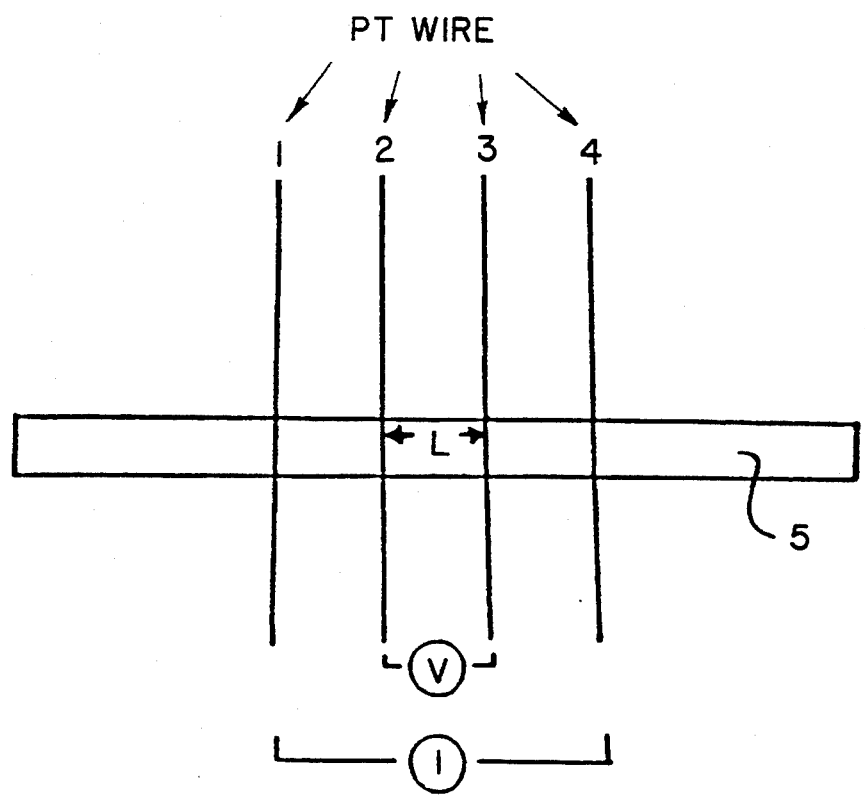
FIG. 1 illustrates a colinear four-probe apparatus for conductivity measurement.

In essence, the present invention involves two steps: (1) formation of a carrier gel; and (2) the polymerization of the intractable polymer. These steps may be carried out consecutively or simultaneously to give conductive, mechanically coherent articles, as will be described in detail in the following sections. The articles formed by the present process—typically fibers, rods, tapes or films of otherwise intractable polymers— are highly electrically conductive, typically having a conductivity of at least about 300 S/cm. The articles are also mechanically quite strong, generally displaying a tensile strength of at least 0.2 g/denier.

Definitions:

By an "intractable" or a "normally intractable" polymer is meant a polymer which cannot be dissolved, shaped or melted by conventional means. The articles disclosed herein are formed from polymers which are generally regarded as intractable.

A "shaped article" as used herein is intended to mean a mechanically coherent object having a defined form, e.g., a fiber, rod, film or tape. The inventiveness of the present process lies in the ability to form shaped articles from conducting polymers that are "intractable".

A "conjugated" polymer as used herein means a polymer having a pi electron network which allows for electron transfer substantially throughout its molecular structure.

A polymer "composite" as used herein means an structural admixture of two or more polymeric materials which may or may not be covalently bound to one another.

An "oriented" material as used herein is intended to mean a polymeric structure in which individual polymer chains are substantially linear and parallel.

Generally, "flexible chain" polymers are structures which allow for more variation in bending angle along the chains (characteristic ratio $C_\infty$ typically less than about 10), while "rigid rod" polymers tend to be straighter and more highly oriented (characteristic ratio $C_\infty$ typically greater than about 100). See P. J. Flory, *Statistical Mechanics of Chain Molecules*, N.Y.: Wiley & Sons—Interscience, 1969, p. 11.

I. Gel Formation

A. Carrier polymers

The criteria for the selection of the carrier polymer are as follows. The material should allow for the formation of mechanically coherent gels at low concentrations, and remain stable in solvents that are capable of dispersing, absorbing or dissolving the reactants for forming the final intractable polymer. Low concentrations of carrier polymer are preferred in order to minimize any negative effect on the properties of the final material; however, the concentration of carrier should be high enough, clearly, to allow for gel formation. Preferred carrier polymers are the high molecular weight (M.W.>100,000) flexible chain polymers, such as polyethylene, isostatic polypropylene, poly(ethylene oxide), polystyrene, and the like. Under appropriate conditions, which can be readily determined by those skilled in the art, these macromolecular materials enable the formation of gels from a wide variety of liquids, including water, acids, and numerous polar and nonpolar organic solvents. Gels manufactured using these carrier polymers have sufficient mechanical strength at polymer concentrations as low as 1%, even as low as 0.1%, by volume.

Mechanically coherent gels can also be prepared from lower molecular weight flexible chain polymers, but generally, higher concentrations of these carrier polymers are then required. Higher concentrations, as noted above, may have an undesirable effect on the properties of the final products.

Exceptions to this rule are gels made from the so-called rigid rod molecules, such as the aramid polymers, aromatic polyesters, PBT, PBI, etc. These polymers are generally of lower molecular weights (typically in the range of 10,000–100,000). Despite these relatively low molecular weights, mechanically coherent gels can be formed from these "stiff" macromolecules at concentrations as low as 1% or even as low as 0.1%. Therefore, aramids, aromatic polyesters, PBT, PBI, etc. are well-suited for the purpose of this invention.

Selection of the carrier polymer is made primarily on the basis of compatibility with the final intractable polymer and its reactants, as well as with the solvent or solvents used. For example, formation of polar intractable polymers generally require gels of polymers that are capable of dissolving or absorbing generally polar reactants. Examples of such gels are those comprised of poly(vinyl alcohol), poly(ethlene oxide), poly-para(phenylene terephthalate), poly-para-benzamide, etc., and suitable liquids. On the other hand, if the polymerization of the final intractable polymer cannot proceed in a polar environment, nonpolar gels are selected, such as those containing polyethylene, polypropylene, poly(tetrafluoro ethylene), poly(butadiene), and the like.

Turning now to the issue of concentration, it is of crucial importance that the gel formed from the carrier solution have sufficient mechanical coherence for further handling during the formation of the final intractable polymer. Therefore, the initial concentration of the carrier polymer generally is selected above about 0.1% by volume, and more preferably above about 1% by volume. On the other hand, it is not desirable to select carrier polymer concentrations exceeding 90% by volume, because this has a diluting effect on the properties of the final intractable polymer product. More preferably, the concentration of the carrier polymer in the gel is below 50% by volume, and still more preferably below 25% by volume.

Thus, in the initial step of the present process, a carrier solution is provided by dissolving a selected carrier polymer in a compatible solvent to a predetermined concentration (using the aforementioned guidelines). The solvent is one in which, clearly, the carrier polymer is substantially soluble and which, furthermore, will not in any way interfere with the gelation or polymerization process. The carrier solution is formed into the selected shape, e.g., a fiber, tape, rod, film or the like, by extrusion or by any other suitable method. After shaping of the carrier solution, (1) gelation is caused to occur; and (2) monomer(s) selected form the final intractable polymer are introduced. Either step (1) or step (2) may be performed first.

B. Gelation

Gels can be formed from the carrier solution in various ways, e.g., through chemical cross-linking of macromolecules in solution, swelling of cross-linked macromolecules, thermoreversible gelation, and coagulation of polymer solutions. In the present invention, the two latter types of gel formation are preferred, although under certain experimental conditions, chemically cross-linked gels may be preferred as carrier gels.

Thermoreversible gelation refers to the physical transformation from polymer solution to polymer gel upon lowering the temperature of a homogeneous polymer solution (although in exceptional cases a temperature elevation may be required). This mode of polymer gelation requires the preparation of a homogeneous solution of the selected carrier polymer in an appropriate solvent according to standard techniques known to those skilled in the art. The polymer solution is extruded or cast into fiber, rod or film form, and the temperature is lowered to below the gelation temperature of the polymer in order to form coherent gels. This procedure is well known and is commercially employed, e.g., for the formation of gels of high molecular weight polyethylene in decalin, paraffin oil, oligomeric polyolefins, etc., as precursors for high-strength polyolefin fibers and films.

"Coagulation" of a polymer solution involves contacting the solution with a nonsolvent for the dissolved polymer, thus causing the polymer to precipitate. This process is well known, and is commercially employed, for example, in the formation of rayon fibers and films, spinning of high-performance aramid fibers, etc.

In some instances, it is preferred to exchange the solvent from which the carrier polymer gel is formed and replace it with another liquid. This liquid exchange is necessary in cases where the formation of the final intractable polymer cannot be carried out in the solvent from which the carrier polymer gel is generated.

II. In Situ Polymerization

A. Reactants

Polymerization generally requires (apart from suitable monomers) one or more catalysts or "initiators" to initiate reaction. Some or all of the reactants necessary for polymerization—i.e., the selected monomers and, typically, a catalyst—can be introduced into the carrier gel at either of two stages: (1) after formation of the carrier solution but prior to gelation; or (2) after gelation. The monomers are selected so as to give a conducting, pi electron conjugated macromolecule upon polymerization.

Suitable reactants—i.e., monomer and catalyst —are introduced most conveniently prior to the formation of the carrier gels by dissolving them, together with the carrier polymer, in a common solvent. Subsequently, the solution is extruded and gelled, and polymerization is then carried out.

Some monomers and catalysts are, however, not stable at the temperature at which the carrier polymer is dissolved or in the solvent which is used to produce the carrier gel. In those instances, the reactants are introduced into the carrier gel after the latter is formed. In this embodiment, the preformed carrier gel is soaked in liquid reactants or in solutions or dispersions of the reactants, or is exposed to gaseous reactants. This method requires miscibility of the reactants with the liquid present in the carrier polymer gel.

B. Polymerization

The polymer synthesis reactions suitable for the embodiment of the invention include Ziegler-Natta olefin (particularly acetylene) polymerization, olefin metathesis (particularly acetylene) polymerization, free radical olefin addition polymerization, anionic olefin polymerization, cationic olefin polymerization and oxidative-coupling polymerization (particularly aniline, pyrrole and benzene). In the latter case, a polar carrier gel (e.g., aramid, polyvinyl alcohol, etc.) would be loaded with ferric chloride ($FeCl_3$) or ammonium persulfate ($(NH_4)_2S_2O_8$). Certain condensation polymerizations such as polyquinoline formation are also suitable for this invention. In the latter case a polar carrier gel (e.g., aramid, polyvinyl alcohol, etc.) would be loaded with $P_2O_5$-enriched polyphosphoric acid.

The present process may be used to prepare conducting articles from either homopolymers or copolymers. Thus, in one embodiment, only one type of monomer is introduced into the carrier gel. In an alternative embodiment, two or more types of monomers are used to form a copolymer. In either case, the carrier polymer may be allowed to remain in the article, forming a composite with the intractable polymeric material that is formed from one or more types of monomers. A particularly preferred composite is a copolymer of polyacetylene and polyethylene, wherein the polyacetylene is the "intractable" polymeric material and the polyethylene serves as the carrier polymer.

In an alternative embodiment, as will be discussed, the carrier polymer may be removed from the final article after polymerization.

C. Post-Polymerization Treatment

After polymerization, a shaped material is obtained that typically includes, in addition to the intractable polymer, carrier polymer, unreacted monomer, catalyst, and the liquid of the carrier gel, all of which may be removed by washing, extraction and/or evaporation. If desired, as noted above, the carrier polymer may be left in the composite to enhance mechanical strength, providing its presence does not significantly limit the properties of interest of the final article, e.g., its electrical conductivity. In such a case, the carrier polymer can be removed by extraction with an appropriate solvent.

The shaped article thus fabricated from the intractable polymer is rendered conductive upon either p-type (oxidative) or n-type (reductive) doping, using standard dopants and techniques.

III. Drawing of the Carrier/Polymer Composite

Frequently, it is desirable to subject the carrier polymer/intractable polymer composite to mechanical deformation, typically by stretching at least about 100% in length, prior to, during, or after polymerization. Deformation of polymeric materials is carried out in order to orient the macromolecules in the direction of draw, which results in improved mechanical properties. In the case of electrically conductive polymers, not only do the mechanical properties improve, but, more importantly, the electrical conductivity also displays a drastic enhancement by tensile drawing.

Deformation of the carrier polymer/intractable polymer composite can be performed either in its as-produced state or after extraction of all or some of the reactants. Deformation of the as-polymerized composite material is advantageous when residual unreacted monomer and/or liquid in the gel act as plasticizers. This will improve deformability and lead to higher molecular orientation and, therefore, enhanced physical properties.

IV. Dynamic In Situ Polymerization During Carrier Gel Drawing

In an alternative embodiment of the invention, polymerization of the intractable material is carried out during deformation of the preformed carrier gel. This procedure is especially useful for systems comprising intractable polymers that are not readily post-drawn.

This method of dynamic polymerization during drawing of the carrier gel requires good deformation characteristics of the latter. Particularly suitable for this purpose are the thermoreversible gels formed from ultra-high molecular weight (M.W. > 1,000,000) carrier polymers. These gels exhibit maximum draw ratios (=final sample length/original sample length) of 60 or more, and may sometimes reach values as high as 300. These exceptionally high draw ratios are very beneficial for the development of orientation not only of the carrier polymer, but also of the intractable polymer, since it is formed during prolonged elongational flow. As a result, the materials produced according to this process have out-standing mechanical and electrical properties.

V. Experimental: Characterization of the Fibers and Films of the Invention

A. Electrical Conductivity Measurements

A four-probe technique for conductivity measurements was used to measure the conductivities of materials herein. FIG. 1 shows a typical colinear four-probe configuration. The four contacts (labeled 1, 2, 3 and 4) are made on the surface of sample 5 in a linear array. A current (I) is passed through probes 1 and 4 and the voltage drop (V) across probes 2 and 3 is measured. The voltage measurement is usually carried out by means of a high impedance voltmeter and is considered to be essentially a zero-current measurement. Hence, the contact resistance between probes 2 and 3 is measured. The voltage measurement is usually carried out by means of a high-impedance voltmeter and is considered to be essentially a zero-current measurement. Hence, the contact resistance between probes 2 and 3 and the sample is minute since the current flow through the voltmeter is minute. Ohmic contacts were carried out using "Electrodag" contacts (3M Co., Minneapolis, Minn.) in which platinum electrodes were attached to the fiber or tapes by means of Electrodag 502—a suspension of finely divided graphite in methyl ethyl ketone. The resistance (R) of the fibers was first measured by the four-probe technique. The length (L) was measured with a ruler, and the cross-sectional area (A) was measured using a scanning electron microscope. The conductivity of the fiber was then calculated by the equation Conductivity=(L/AR).

B. Calorimetric Measurements

The composite materials of the invention were tested using a differential scanning calorimeter (Mettler DSC TA3000). Samples of about 4 mg were used. The heating rate was 10° C./min. Melting temperatures and enthalpies of fusion were measured according to standard techniques. Where appropriate and possible, the enthalpy of fusion of the samples was employed to determine the quantity of the carrier polymer in the composite.

C. Mechanical Properties

The mechanical properties of the various materials described in the examples were tested at room temperature using an Instron Tensile Tester model 1122. The initial length of the test specimens was 10 mm, and the cross-head speed was 10 mm/min. The modulus of the fibers was taken to be the initial, or Young's, modulus. Cross-sectional areas of the fibers were measured by scanning electron microscopy on fractured samples. The denier (linear density) of the samples was measured by weighing 100 mm of the fibers.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

EXAMPLE 1

A. Preparation of Catalyst

Ten ml of the solvent decalin (decahydronaphthalene, Fisher Scientific) were poured into a 50 ml three-neck flask. The solvent was frozen at liquid nitrogen temperature and degassed under vacuum ($<3\times10^{-6}$ mm Hg pressure) for 2 minutes. Subsequently, the decalin was thawed at room temperature. This degassing procedure was repeated three times.

Then, 3.1 ml of $Al(C_2H_5)_3$ was added to the degassed decalin under an argon blanket. Next, 4.1 ml of $Ti(OC_2H_9)_4$ was added to the solution drop by drop over a period of 7 min, again under a blanket of argon. The mixture was stirred for 1 hour at a temperature of 88° C. under argon. Finally, the homogeneous catalyst solution was cooled down to room temperature.

B. Preparation of Gel

Ten ml of decalin were mixed, at room temperature, with 8.6 mg of ultra-high molecular weight polyethylene (Hostalen GUR 412, Hoechst) in a 50 ml three-neck flask. This mixture was degassed according to the procedure described in A. Subsequently, the degassed mixture was heated at a temperature of 160° C. for 45 minutes while stirring under an argon blanket. A viscous solution was obtained.

A glass tube with an inner diameter of 20 mm and a length of 400 mm was connected to the flask, and a liquid fiber was drawn from the polyethylene solution into the tube. The liquid fiber rapidly cooled to ambient temperature and formed a gel filament. This operation was carried out under a flow of argon. Subsequently, the glass tube was closed and transferred and attached to the three-neck flask that contained the catalyst. The flask was tilted, which caused the gel fiber to be contacted with the catalyst solution. The gel was soaked at room temperature in this solution for a period of 1 hour. The excess catalyst solution was returned to the three-neck flask.

C. Polymerization

The glass tube containing the polyethylene/catalyst gel fiber was removed from the three-neck flask and connected to a vacuum line, where it is degassed for 5 minutes. Subsequently the gel fiber was exposed to 600 Torr of acetylene (monomer) gas for 90 minutes to yield the polyethylene/polyacetylene composite fiber. After the polymerization was completed, the remaining monomer gas was trapped in a container that was cooled with liquid nitrogen. The composite fiber was then degassed under vacuum for 10 minutes.

The glass tube containing the fiber was then transferred into an argon-filled glove bag. The composite fiber was washed to remove the catalyst with purified toluene until the washing solution remained colorless.

The composite fiber was of 420 denier.

The polyacetylene content of the composite fiber was estimated to be 83% by weight, using the calorimetric method described above.

The mechanical properties of the composite fiber were determined to be:

Young's modulus, 6.8 g/den
tensile strength, 0.2 g/den
elongation at break, 75%.

EXAMPLE 2

Figure 2:
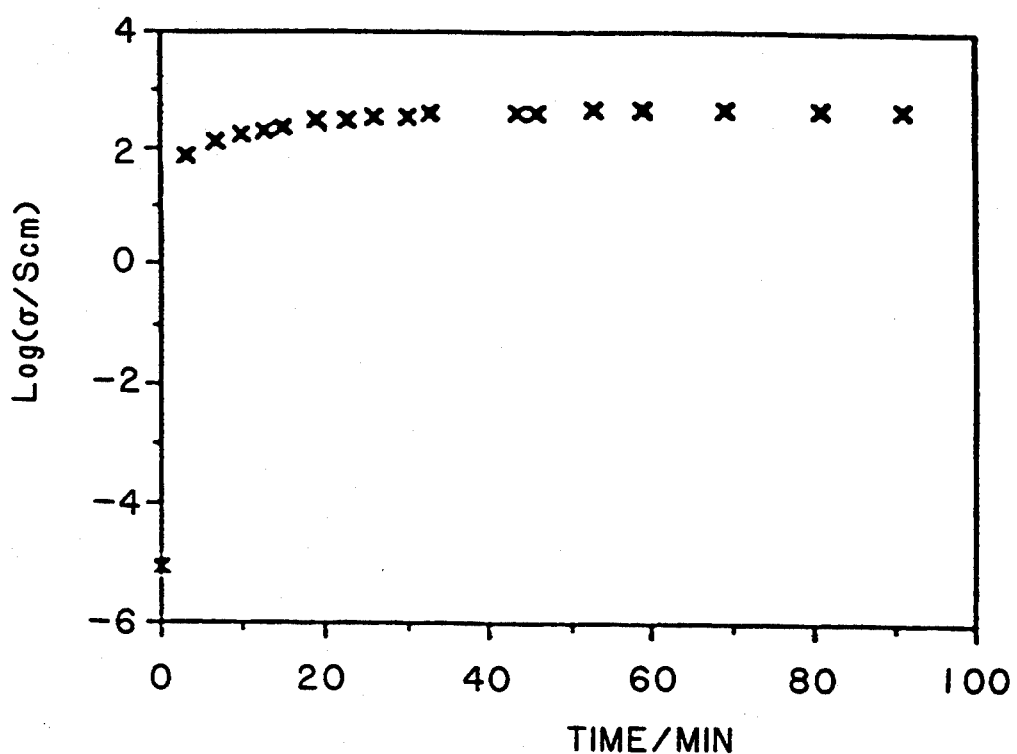
FIGS. 2, 3 and 4 show, graphically, the conductivity of a polyacetylene/polyethylene composite fiber prepared according to the method of the present invention.

The polyacetylene/polyethylene composite fiber of Example 1 was doped at room temperature in a saturated solution of 2.65 g of iodine in 100 ml carbon tetrachloride for various periods of time. The doped fiber was dried and its electrical conductivity measured using a 4-probe device. The conductivity of the composite fiber reached a constant value of 450 S/cm after doping for about 45 min, as is illustrated in FIG. 2.

EXAMPLE 3

A. Preparation of Catalyst

Ten ml of mineral oil (Fisher Scientific) was poured into a 50 ml three-neck flask. The solvent was degassed under a vacuum ($<3\times10^{-6}$ mmHg pressure) for 1 hour.

Then 3.1 ml of $Al(C_2H_5)_3$ was added to the degassed mineral oil under an argon blanket. Next 4.1 ml of $Ti(OC_4H_9)_4$ was added to the solution drop by drop over a period of 7 minutes, again under a blanket of argon. The mixture was stirred for 1 hour at a temperature of 88° C. under argon. Finally, the homogenized catalyst solution was cooled down to room temperature.

B. Preparation of Gel

Ten ml of mineral oil was mixed, at room temperature, with 8.6 mg of ultra-high molecular weight polyethylene (Hostalen GUR 412, Hoechst) in a 50 ml three-neck flask. This mixture was degassed according to the procedure described in A. Subsequently, the degassed mixture was heated while stirring under an argon blanket for 45 minutes at a temperature of 160° C. A viscous solution was obtained. This solution was transferred into a laboratory-scale fiber-spinning apparatus. A polyethylene gel fiber was spun according to standard procedures.

C. Polymerization

Figure 3:
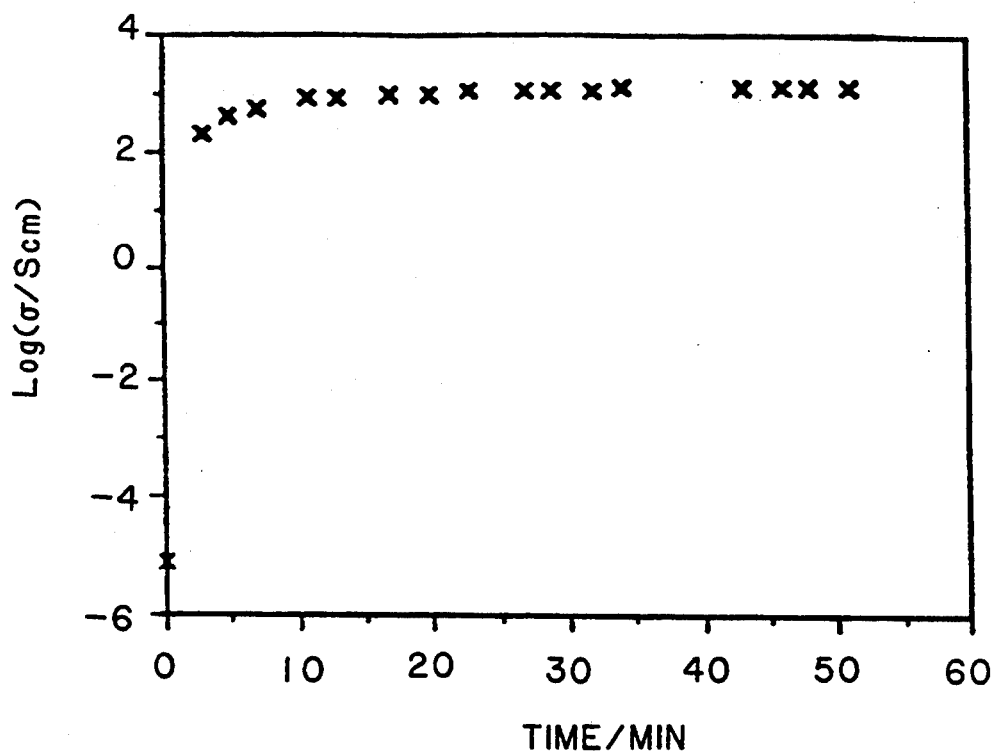

The as-spun polyethylene gel fiber was transferred to the catalyst solution and soaked for 1 hour at room temperature. The polyethylene/catalyst gel fiber was inserted in a container, degassed and then exposed to 51 cm Hg pressure of acetylene gas. The resulting polyacetylene/polyethylene composite fiber was washed with toluene until the washing solution became colorless. Subsequently, it was washed with methanol/5% HCl solution for 50 minutes and then for 30 minutes with methanol. Finally, the composite fiber was dried under a flow of argon and then under vacuum. The final fiber was doped according to the technique described in Example 2 and its electrical conductivity measured. It was found that the conductivity reached a maximum value of 1200 S/cm after about 1 hour of doping, as illustrated in FIG. 3.

The composite fiber was of 390 denier.

The polyacetylene content of the composite fiber was estimated to be 82% by weight, using the calorimetric method described above.

The mechanical properties of the composite fiber were determined to be:

Young's modulus, 3.5 g/den
tensile strength, 0.7 g/den
elongation at break, 170%

EXAMPLE 4

Figure 4:
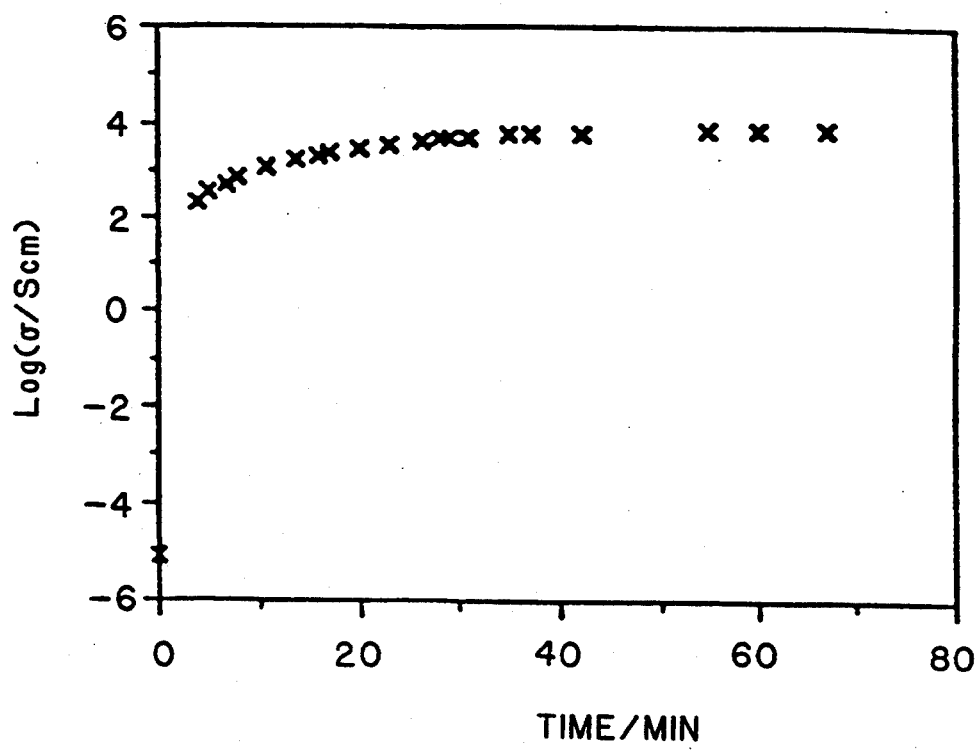

Example 3 was repeated, except that, before the washing procedure, the as-polymerized composite fiber was drawn at room temperature, in argon, to 2.2 times its original length using a laboratory stretching frame. Subsequently, the drawn fiber was washed according to the procedure in Example 3. The final fiber was doped according to the technique described in Example 2, and its electrical conductivity measured. It was found that the conductivity reached a maximum value of 6000 S/cm after 1 hour of doping, as illustrated in FIG. 4.

The drawn composite fiber was of 180 denier. Its mechanical properties were determined to be:
Young's modulus, 6 g/den
tensile strength, 2.1 g/den
elongation at break, 50%.

EXAMPLE 5

A. Preparation of PPTA gel:

Poly-para (Phenyleneterephthalamide) (PPTA, Kevlar ® from DuPont of Wilmington, Del.) was prepared as follows. 71.6 g of (97%) sulfuric acid was mixed with 1.07 g (PPTA) under stirring for 2 days at room temperature in a 250 ml flask. A viscous solution was obtained. This solution was transferred into a 0.75 oz syringe. The PPTA solution was spun using a syringe, to form a gel fiber, into a 1.2N solution of aniline in 1N HCl. The gel fiber was left for 2 hours to absorb the aniline monomer.

B. Polymerization

This PPTA/aniline gel fiber was transferred into an aqueous 0.025N $(NH_4)_2S_2O_8$ solution and the monomer was allowed to polymerize for 2 hours. The resulting PPTA/polyaniline composite fiber was washed with 1N $H_2SO_4$ solution, and then dried under vacuum for 24 hours. The electrical conductivity of said PPTA/polyaniline fiber was 0.3 S/cm.

This example illustrates the use of rigid chain molecules as carrier polymers. The PPTA had a $M_w$ of 40,000; $C_\infty = 124$.

We claim:

1. A composite article comprising a structural admixture of an intractable conjugated polymer and a carrier polymer, said article having tensile strength of about at least about 0.2 g/denier and electrical conductivity of at least about 300 S/cm.

2. The composite article of claim 1, having a tensile strength of at least about 1 g/denier and electrical conductivity of at least about 1000 S/cm.

3. The composite article of claim 1, wherein the intractable conjugated polymer is polyacetylene and the carrier polymer is polyethylene.

4. The composite article of claim 2, wherein the intractable conjugated polymer is polyacetylene and the carrier polymer is polyethylene.

5. An article prepared by a process for making electrically conductive shaped articles of intractable conjugated polymeric materials, the process comprising the steps of:
   (a) providing a carrier solution by dissolving in a compatible solvent
      (i) a predetermined amount of a monomer selected to form an intractable conjugated polymer upon polymerization,
      (ii) a catalytic amount of a polymerization initiator, and
      (iii) about 0.1 wt. % to about 50 wt. % of a carrier polymer selected from the group consisting of flexible chain polymers having a molecular weight greater than about 100,000, rigid chain polymers having a molecular weight between about 10,000 and about 100,000, and mixtures thereof;
   (b) forming said carrier solution into the shape of the selected article;
   (c) treating said carrier solution so as to cause gelation, thereby providing a carrier gel;
   (d) causing polymerization of said monomer to give a shaped article of polymerized gel; and
   (e) rendering the shaped article conductive through p-type (oxidative) or n-type (reductive) doping;
   wherein said intractable polymer is polyaniline, said carrier polymer is poly-para(phenyleneterephthalamide), and said shaped article is a composite of polyaniline and poly-para(phenyleneterephthalamide).

6. An article prepared by a process for making electrically conductive shaped articles of intractable conjugated polymeric materials, the process comprising the steps of:
   (a) providing a carrier solution by dissolving in a compatible solvent about 0.1 wt. % to about 50 wt. % of a carrier polymer selected from the group consisting of flexible chain polymers having a molecular weight greater than about 100,000, rigid chain polymers having a molecular weight between about 10,000 and about 100,000, and mixtures thereof;
   (b) forming said carrier solution into the shape of the selected article;
   (c) treating said carrier solution so as to cause gelation, thereby providing a carrier gel;
   (d) introducing into said carrier gel:
      (i) a predetermined amount of a monomer selected to form an intractable conjugated polymer upon polymerization, and
      (ii) a catalytic amount of a polymerization initiator;
   (e) causing polymerization of said monomer to give a shaped article of polymerized gel; and
   (f) rendering the shaped article conductive through p-type (oxidative) or n-type (reductive) doping;
   wherein said intractable polymer is polyaniline, said carrier polymer is poly-para(phenyleneterephthalamide), and said shaped article is a composite of polyaniline and poly-para(phenyleneterephthalamide).

7. The article of claim 1 which is a fiber.

8. The article of claim 1 which is a rod.

9. The article of claim 1 which is a film.

10. The article of claim 1 which is a tape.

11. The article of claim 1 having a draw ratio of at least about 2.

12. A composite article comprising a structural admixture of an intractable conjugated polymer and a carrier polymer, wherein said conjugated polymer is polyaniline and said carrier polymer is poly-para(phenyleneterephthalamide).

13. The composite article of claim 12 in the form of a fiber.

14. The composite article of claim 13, wherein said fiber has an electrical conductivity of at least about 0.3 S/cm.

* * * * *